US010585716B2

(12) United States Patent
Knowles

(10) Patent No.: US 10,585,716 B2
(45) Date of Patent: Mar. 10, 2020

(54) PARALLEL COMPUTING

(71) Applicant: Graphcore Limited, Bristol (GB)

(72) Inventor: Simon Christian Knowles, Corsten (GB)

(73) Assignee: Graphcore Limited, Bristol (GB)

( * ) Notice: Subject to any disclaimer, the term of this patent is extended or adjusted under 35 U.S.C. 154(b) by 144 days.

(21) Appl. No.: 15/885,949

(22) Filed: Feb. 1, 2018

(65) Prior Publication Data

US 2019/0121678 A1 Apr. 25, 2019

(30) Foreign Application Priority Data

Oct. 20, 2017 (GB) .................................. 1717292.5

(51) Int. Cl.
*G06F 9/46* (2006.01)
*G06F 9/52* (2006.01)
(Continued)

(52) U.S. Cl.
CPC ............ *G06F 9/522* (2013.01); *G06F 9/4881* (2013.01); *G06F 13/1657* (2013.01)

(58) Field of Classification Search
CPC ..... G06F 9/522; G06F 9/4881; G06F 13/1657
See application file for complete search history.

(56) References Cited

U.S. PATENT DOCUMENTS

| | | | |
|---|---|---|---|
| 5,142,686 A | 8/1992 | Hecht et al. | |
| 2009/0031089 A1* | 1/2009 | Tuominen | G06F 7/785 711/149 |

FOREIGN PATENT DOCUMENTS

| | | |
|---|---|---|
| EP | 0096576 B1 | 6/1987 |
| GB | 1717292.5 | 4/2019 |

(Continued)

OTHER PUBLICATIONS

UK Combined Search and Examination Report for Application No. GB 1717292.5 dated Apr. 15, 2019.
(Continued)

*Primary Examiner* — Camquy Truong
(74) *Attorney, Agent, or Firm* — Haynes and Boone, LLP

(57) ABSTRACT

A method for executing a computer program, the method implemented by a processor comprising a plural number of computing units and an interconnect connected to the computing units, wherein each computing unit comprises a processing unit and a memory having at least two memory ports, each port assignable to one or more respective regions of the memory, wherein the method comprises at each computing unit: performing an initial step of the program to write: an initial output value to an output region of the memory, and an initial input value to an input region of the memory; and performing a subsequent step of the program by: in a compute phase: assigning one of the two ports to both the input region and the output region; executing code sequences on the processing unit to compute an output set of one or more new output values, and writing the output set to the output region, the output set computed from the initial output and initial input values, each of which is retrieved via said one port in the compute phase; when the compute phase has completed, in an exchange phase: assigning a first of the two ports to the output region and a second of the two ports to input region; and retrieving a new output value of the output set from the output region via said first port and sending the retrieved value to a different computing unit via the interconnect, and receiving via the interconnect a new input value which has been computed by a different computing unit in the subsequent step and writing the received value to the input region via said second port.

25 Claims, 11 Drawing Sheets

(51) Int. Cl.
*G06F 13/16* (2006.01)
*G06F 9/48* (2006.01)

(56) References Cited

FOREIGN PATENT DOCUMENTS

TW   M515677      1/2016
TW   201717004 A  5/2017

OTHER PUBLICATIONS

Cha et al., H-BSP: A Hierarchical BSP Computation Model. The Journal of Supercomputing, Feb. 2001;18(2):179-200.
Kapre et al., An NoC Traffic Compiler for Efficient FPGA Implementation of Sparse Graph-Oriented Workloads. International Journal of Reconfigurable Computing. vol. 2011 (2011), Article ID 745147. 15 pages.
Valiant, A bridging model for parallel computation. Communications of the ACM, Aug. 1990;33(8):103-11.
Taiwanese Office Action for Application No. 10820960850 dated Oct. 14, 2019, 3 pages.

\* cited by examiner

PARALLEL COMPUTING

TECHNICAL FIELD

The subject matter is in the field of parallel computing.

BACKGROUND

Parallel computing is a form of computation whereby multiple operations are carried out simultaneously by different processing units of a parallel computer. A parallel programming model is a model for writing parallel computer programs to be compiled and executed on a parallel computer. A parallel programming model must specify more than a sequential model as, in addition to specifying how tasks to be carried out by an individual processor are to be defined, a parallel programming model must also specify:
- Available parallelism i.e. the decomposition of a program into tasks which may be executed simultaneously, from time-to-time;
- Communication (paths and types) between simultaneous tasks;
- Synchronization required to preserve program meaning, i.e. causality.
- Collective termination criteria, e.g. whether the program is to terminate by consensus or majority.

A parallel program may also specify a schedule (partial execution order), in addition to the essential synchronization information, to optimize performance.

A simple and popular software parallel programming model is the Bulk Synchronous Parallel (BSP) model, first described in "A bridging model for parallel computation", Leslie G. Valiant, Communications of the ACM, Volume 33 Issue 8, August 1990. FIG. 1 show a high level representation of the principles of BSP. Software conformant to the BSP model guarantees deadlock freedom and makes precedence explicit. In the BSP model as originally described by Valiant, computation proceeds in a number of "supersteps" 102. The supersteps 102 are separated by barrier synchronization. During each superstep 102, tasks 104 are independent (i.e. can execute in parallel); a barrier 106 is crossed to commence the next superstep when and only when all tasks have completed execution in that superstep. Tasks can post messages, represented by the arrows in FIG. 1, to themselves or to other tasks at any time during each superstep (though FIG. 1 does not reflect this explicitly).

However, those messages are not visible to receivers until the start of the next superstep. In each superstep, each task may operate on output data which was generated by that task itself in the previous superstep and/or on output data which was generated by other task(s) in the previous superstep.

Typically, a (possibly large) number of tasks will execute on each processor in each superstep. That is, typically there are (possibly many) more tasks than there are physical processors. During each superstep, each processor may perform computation on data in its local memory or registers, which may include data received as messages from other processors in the previous superstep (i.e. output data that was generated by tasks running on different processors in the previous superstep) and/or output data computed by that processor itself in the previous superstep (i.e. output data that was generated by tasks running on that same processor in the previous superstep).

According to this BSP model, there is a single synchronization of all processors once per superstep, and a superstep comprises both computation and the exchange of messages.

Parallel computing has useful applications in the context of machine learning. To date, efforts have focused on implementing machine learning algorithms with BSP in distributed, cloud-based computer systems.

SUMMARY

A first aspect of the invention provides a method for executing a computer program, the method implemented by a processor comprising a plural number of computing units and an interconnect connected to the computing units, wherein each computing unit comprises a processing unit and a memory having at least two memory ports, each port assignable to one or more respective regions of the memory, wherein the method comprises at each computing unit: performing an initial step of the program to write: an initial output value to an output region of the memory, and an initial input value to an input region of the memory; and performing a subsequent step of the program by: in a compute phase: assigning one of the two ports to both the input region and the output region; executing code sequences on the processing unit to compute an output set of one or more new output values, and writing the output set to the output region, the output set computed from the initial output and initial input values, each of which is retrieved via said one port in the compute phase; when the compute phase has completed, in an exchange phase: assigning a first of the two ports to the output region and a second of the two ports to input region; and retrieving a new output value of the output set from the output region via said first port and sending the retrieved value to a different computing unit via the interconnect, and receiving via the interconnect a new input value which has been computed by a different computing unit in the subsequent step and writing the received value to the input region via said second port.

The time efficiency of the exchange phase is maximized by allowing messages to be sent and received simultaneously by assigning different ports to the input and output regions in the exchange phase at each computing unit (tile). However, the inventor has recognized that, in the compute phase, it is more time efficient to access the input and output regions via the same port. This is because, in the context of the compute phase, it is irrelevant which of the earlier values used to compute the new output set were computed by the same computing unit (i.e. on tile) and which were computed by a different computing unit(s) (i.e. off tile), and it is thus simpler and quicker for the earlier on tile and off tile values to all be accessed by the code sequences (codelets) via the same port in the exchange phase. In other words, dynamically varying the port allocations in this manner reduces the overall time it takes to complete the exchange phase and the overall time it takes to complete the compute phase.

In embodiments, said one port may also assigned to a first workspace region in the compute phase. The output set may be computed using first working data which is local to the computing unit (i.e. not sent to any other computing unit but generated and updated only at the processing unit in question), held in the first workspace region and retrieved via said one port in the compute phase.

The other of the two ports may be assigned to a second workspace region of the memory in the compute phase. The output set may be computed using second working data which is local to the computing unit, held in the second workspace region and retrieved via said other port in the compute phase.

The inventor has further recognized that some types of working data can be more efficiently accessed via that same port and the input and output regions, whereas other types of working data are more efficiently accessed via the other 'spare' port. Thus such embodiments provide a mechanism by which the efficiency of the compute phase can be further increased.

For example, the inventor has recognized that working data defining communication paths (edges) between different codelets can be accessed most efficiently via the same port as the communicated data itself, whereas data that is used to manipulate the communicated data to generate the new set of output values can be most efficiently accessed via the spare port. A specific example is a processor implementing neural network, which is discussed in detail below.

In embodiments, said one port may also be assigned to a first workspace region in the compute phase, the output set computed using first working data which is local to the computing unit, held in the first workspace region and retrieved via said one port in the compute phase.

The first working data may identify a first location in the output region at which the initial output value is held and/or a second location in the input region at which the initial input value is held.

The first working data may comprise a first memory pointer to the first location and/or a second memory pointer to the second location.

The other of the two ports may be assigned to a second workspace region of the memory in the compute phase, the output set computed using second working data which is local to the computing unit, held in the second workspace region and retrieved via said other port in the compute phase.

The second working data may comprise a local value, and at least one new output value of the output set is computed in the compute phase by evaluating a function with the local value and the initial output and/or the initial input value as inputs to said function, the initial output and/or initial input retrieved via said one port and the local value retrieved via said other port.

The second working data may comprise a first and a second local value, and the at least one new first value may be computed as nonlinear function of a summation, the summation being of at least: a product of the first local value and the initial output value, and a product of the second local value and the initial input value, the initial values retrieved via said one port and the local values retrieved via said other port.

The new output value may be retrieved from the output region and sent and the new input value may be written to the input region by executing a single communicate instruction on the processing unit.

The single communicate instruction may have an output operand identifying a location in the output region at which the new output value is held and an input operand identifying a location in the input region to which the received new input value is written.

The exchange phase may be performed by performing a number of sub-phases in turn and, in each sub-phase, each computing unit may send data to at most one respective other computing unit, wherein the respective other computing unit does not receive data from any other computing unit in that sub-phase, and wherein that computing unit does not send data to the respective other computing unit in any other sub-phase of the exchange phase.

The number of sub-phases may be one fewer than the plural number of processing units.

A schedule may be held at each processing unit, which identifies, for each sub-phase, the respective other computing unit.

The schedule may comprise at least part of a Latin square.

The single communicate instruction may be executed in one of the sub-phases and may not include any operand identifying the other processing unit.

Each computing unit may be connected to the interconnect by a respective connection having an individual bandwidth, and the interconnect may have a bandwidth at least as great as an aggregate of the individual bandwidths.

Each processing unit may have one or more control registers, wherein said one port is assigned to both the input and output regions in the compute phase by writing compute phase partitioning data to at least one of the control register(s), and wherein said first and said second ports may be assigned to the output and input regions respectively in the exchange phase by writing exchange phase partitioning data to at least one of the control register(s).

The compute phase partitioning data may be in the form of a single address in the memory, and the exchange phase partitioning data is in the form of a different single address in the memory.

The processor may comprise synchronization logic connected to each of the computing units, wherein at each computing unit: at the end of the compute phase, that computing unit may instigate an exchange request signal to the synchronization logic, wherein the synchronization logic may instigate an exchange proceed signal to each computing unit only when exchange request signals have been received from all of the computing units, and that computing unit may instigate the exchange phase in response to receiving the exchange proceed signal.

At each computing unit: the initial input value may be received in an exchange phase of the initial step, at the end of the exchange phase, that computing unit may instigate a compute request signal to the synchronization logic, wherein the synchronization logic may instigate a compute proceed signal to each computing unit only when compute request signals have been received from all of the computing units, and that computing unit may instigate the compute phase of the subsequent step in response to receiving the compute proceed signal.

The synchronization logic may be dedicated synchronization hardware.

The subsequent step may be the first of multiple subsequent steps which are performed in turn, each by computing an respective output set of one or more respective new output values in a compute phase of that step which are written to the output region, and receiving a respective new input value in an exchange phase of that step which is written to the input region, the respective output set computed from an output value that was written to the output region in the compute phase of the preceding step and/or an input value that was written to the input region in the exchange phase of the preceding step.

For each subsequent step, the local value may be updated based on the output value that was written to the output region in the compute phase of the preceding step and/or the input value that was written to the input region in the exchange phase of the preceding step; and wherein at least one respective new output value may be computed in the compute phase of each subsequent step by evaluating said function with the local variable as updated for that step and the output value that was written to the output region in the compute phase of the preceding step and/or the input value that was written to the input region in the exchange of the preceding step as inputs to said function.

Another aspect of the invention provides a processor for executing a computer program, the processor comprising a plural number of computing units and an interconnect connected to the computing units, wherein each computing unit comprises a processing unit and a memory having at least two memory ports, each port assignable to one or more respective regions of the memory, wherein each computing unit is configured to: perform an initial step of the program to write: an initial output value to an output region of the memory, and an initial input value to an input region of the memory; and perform a subsequent step of the program by: in a compute phase: assign one of the two ports to both the input region and the output region; execute code sequences on the processing unit to compute an output set of one or more new output values, and write the output set to the output region, the output set computed from the initial output and initial input values, each of which is retrieved via said one port in the compute phase; when the compute phase has completed, in an exchange phase: assign a first of the two ports to the output region and a second of the two ports to input region; and retrieve a new output value of the output set from the output region via said first port and send the retrieved value to a different computing unit via the interconnect, and receive via the interconnect a new input value which has been computed by a different computing unit in the subsequent step and write the received value to the input region via said second port.

Another aspect of the invention provides computer program product comprising executable instructions configured, when execute on the processor, to implement the method.

Another aspect of the invention provides a computing unit for use in a processor for executing a computer program, the computing unit comprising a processing unit and a memory having at least two memory ports, each port assignable to one or more respective regions of the memory, the computing unit being configured to: perform an initial step of the program to write: an initial output value to an output region of the memory, and an initial input value to an input region of the memory; and perform a subsequent step of the program by: in a compute phase: assign one of the two ports to both the input region and the output region; execute code sequences on the processing unit to compute an output set of one or more new output values, and write the output set to the output region, the output set computed from the initial output and initial input values, each of which is retrieved via said one port in the compute phase; when the compute phase has completed, in an exchange phase: assign a first of the two ports to the output region and a second of the two ports to input region; and retrieve a new output value of the output set from the output region via said first port and send the retrieved value to a different computing unit via an interconnect of the processor, and receive via the interconnect a new input value which has been computed by a different computing unit in the subsequent step and write the received value to the input region via said second port.

Another aspect provides a method for executing a computer program, the method implemented by a processor comprising multiple computing units and an interconnect connected to the computing units, wherein each computing unit comprises a processing unit and a memory accessible to the processing unit, wherein the method comprises at each computing unit: performing an initial iteration of a sequence of steps, the sequence comprising an earlier step and a later step; and performing a subsequent iteration of the sequence of steps; wherein each iteration of each step is performed by: executing code sequences on the processing unit to compute an output set of one or more output values, writing the output set to the memory, sending via the interconnect an output value of the output set to a different computing unit, receiving via the interconnect an input value which has been computed by a different computing unit in the same iteration of the same step, and writing the input value to the memory; wherein: i) at least a first output value of the output set that was computed in the initial iteration of the earlier step is used to compute the output set in the subsequent iteration of the later step and/or is sent to a different computing unit in the subsequent iteration of the later step, and ii) at least a second output value of the output set that was computed in the subsequent iteration of the earlier step is used to compute the output set in the subsequent iteration of the later step and/or is sent to a different computing unit in the subsequent iteration of the later step.

This provides the programmer with greater flexibility, as compared with conventional BSP, by permitting different levels off communication between code sequences (codelets) i.e. both inter-iteration and intra-iteration communication.

DETAILED DESCRIPTION OF EMBODIMENTS

Figure 1:
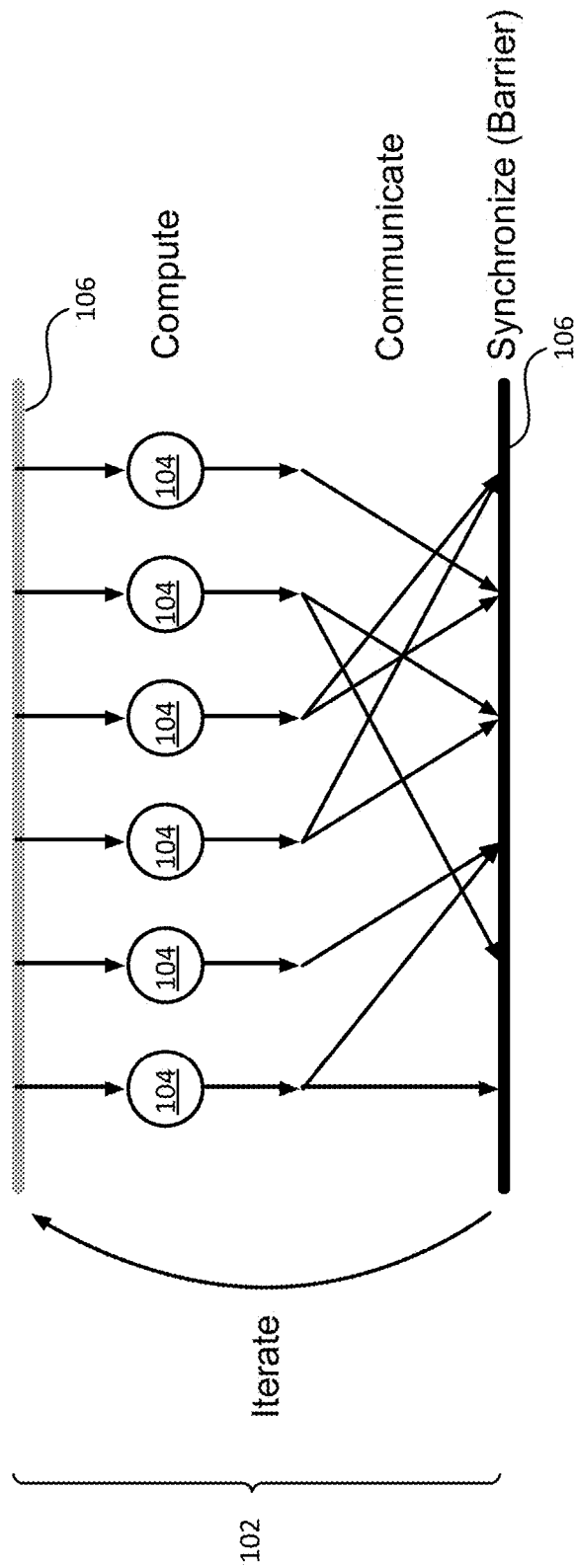
FIG. 1 gives a high-level, schematic representation of some of the principles of conventional BSP.
Figure 2:
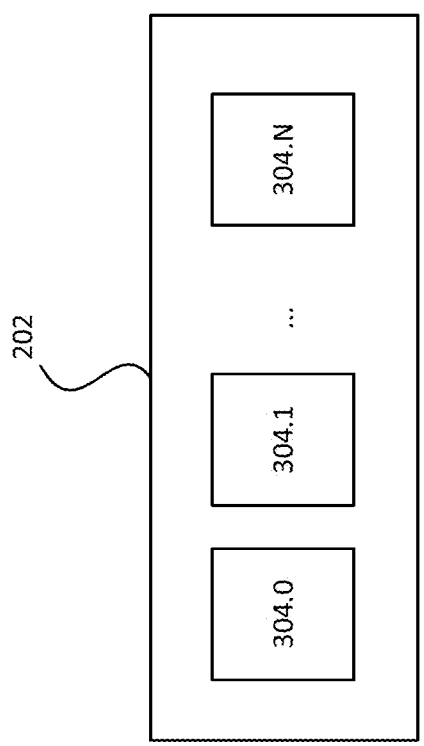
FIG. 2 shows a schematic block diagram of a multi-processor.
Figure 3:
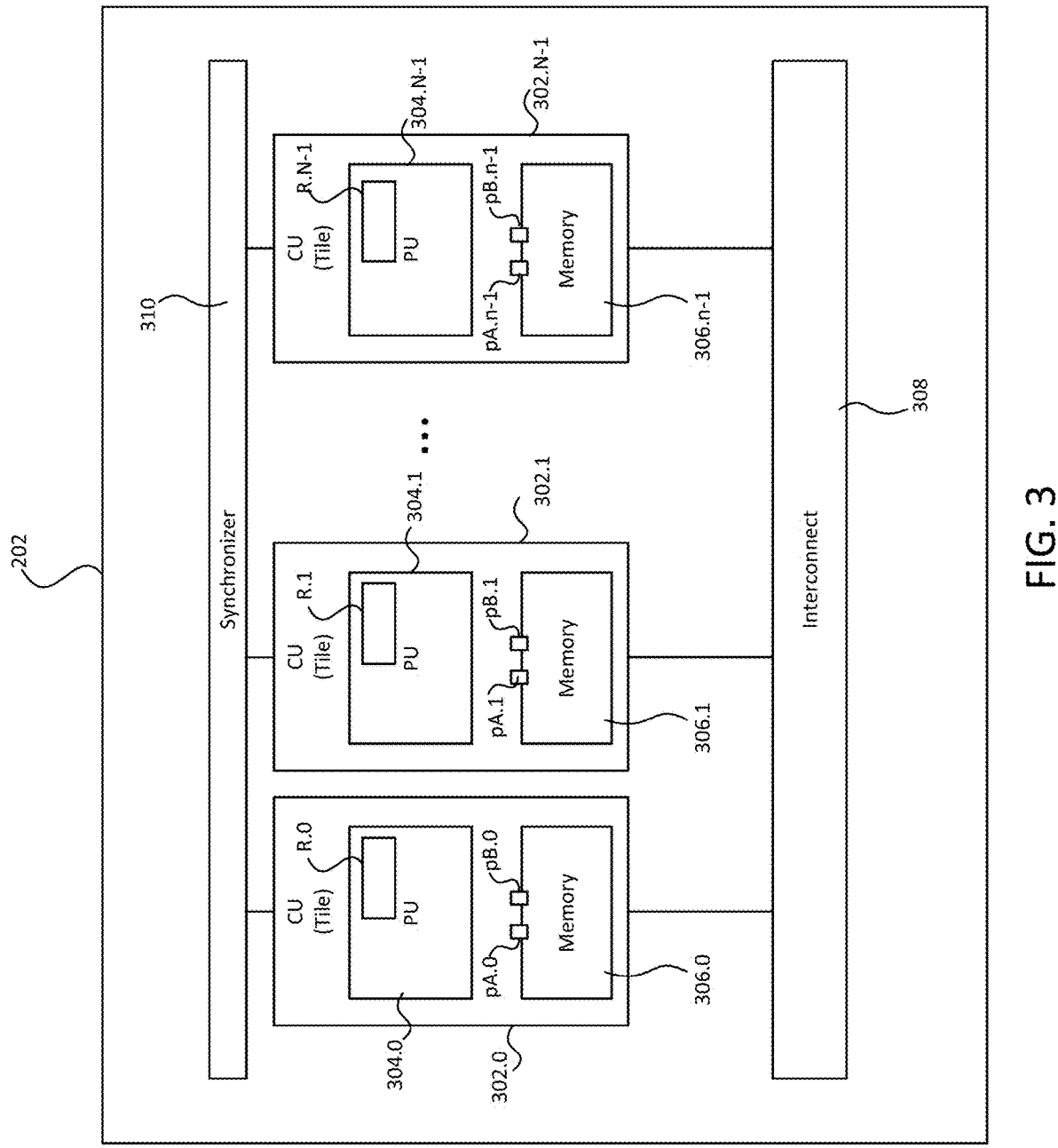
FIG. 3 shows a schematic block diagram of a multi-processor in further detail.

With reference to FIGS. 2 and 3, a distributed memory multi-processor 202 (analytic compute module) comprises multiple processing units 304.0, . . . , 304.N which can be configured to perform computations in parallel.

The multi-processor 202 is a microprocessor. It may for instance be embedded in a single chip or die, or it may be embedded in a set of two or more interconnected die, and/or in a single integrated circuit (IC) package. The analytic compute module 202 executes a parallel computer program to generate, from input value(s), output data in the form of one or more output value(s).

The analytic compute module 202 can perform tasks to which it is particularly well suited due its parallel structure. For instance, the analytic compute module 202 may implement a machine learning (ML) model, which has been learned from a certain data, and which can be used to make predictions from similar data. The model may be learned in an offline training phase and/or online whereby the model learns as it is used. The analytic compute module can receive input value(s) and make predictions based on the model.

FIG. 3 shows a block diagram of the distributed memory multiprocessor 202. The processor 202 comprises a plurality of N tiles (computing units) 302.0, 302.1, ..., 302.N-1, an interconnect 308 to which the N 302.0, 302.1, ..., 302.N-1 tiles are connected, and synchronization logic 310 to which the N 302.0, 302.1, ..., 302.N-1 tiles are also connected. Herein, the notation "302.n" is used in the text and various figures to denote a single one of the N tiles 302.0, 302.1, ..., 032.N-1. Reference characters of the form "*.n" are used to refer to features that are exhibited by each of the N tiles individually. Accordingly, any description pertaining to a tile "302.n", or any feature "*.n" thereof, can apply to any one of the N tiles 302.0, 302.1, ..., 302.N-1 individually. The reference 304 is used to refer to the processing units collectively. Note occasionally individual processing units are referred to herein as processors—it will be clear from the context whether "processor" refers to the multi-processor 202 or an individual processing unit 304.n thereof. The synchronization logic 310 is implemented as dedicated synchronization hardware in this example, though the possibility of other e.g. software or combined hardware/software implementations are not excluded.

Each tile 302.n comprises a respective processing unit 304.0, having at least one control register R.n, and a respective memory 306.n, having a first memory port pA.n and a second memory port pB.n. The respective processing unit 304.n of each tile 302.n is configured to execute (linear) code sequences i.e. sequences of low-level machine code instructions that are executed one at a time. By each of the N processing units 304.0, 304.1, ..., 304.N-1 executing a respective code sequence simultaneously with one another, the N processing units 304.0, 304.1, ..., 304.N-1 are able to effect parallel computations. Though not shown explicitly in FIG. 3, the memory 306.n is formed of a set of independent memory banks, each bank having a unique memory address. Each bank is an example of a memory location as the term is used herein. The memory 306.n is accessible to the processor 304.n via the memory's first port pA.n or second port pB.n. Notably, the memory 304.n is accessible via its first port pA.n and second port pB.n simultaneously, whereby the processor 304.n can read or write a value from/to one location in the memory 306.n via the first port pA.0 simultaneously reading or writing a value from/to another location in the memory 306.n via the second port. "Simultaneously" means that the operations at least partially overlap in time.

The interconnect 308 provides communication of messages between different processing units. Each processing unit 304.n can send data to any other processing units 304.n' (n'·n) via the interconnect 308, and can receive data from any other processing unit 304.n' via the interconnect 308 which has been communicated to that processing unit 304.n by that other processing unit 304.n' in a similar manner. By utilising the two ports pA.n, pB.n, each processing unit 302.n is able to perform simultaneous send and receive operations, to send and receive data via the interconnect 308 respectively, by writing data received via the interconnect 308 to the memory 304.n via one of the ports (e.g. the second port pB.n) simultaneously with retrieving data for sending via the other port (e.g. the first port pA.n).

A software program running on the processor 202 to perform an overall task splits the overall task into a number of pieces, referred to herein as "tasklets", which can operate in parallel. Each tasklet comprises a corresponding part of the program code, referred to herein as a "codelet", and a corresponding part of the program data on which the codelet operates. Herein, "performing a tasklet" (or similar) means running the corresponding codelet on the corresponding program data. Each codelet is in the form of a code sequence that runs on one of the individual processing units 304. For a so-called a data-parallel program, all codelets are the same, though they will generally operate on different elements of data. For a so-called task-parallel program, the programs tasklets are different. Often a parallel computer program will combine both types of parallelism. Note that the present subject matter can be applied to all such types of parallel program.

Tasklets interact by sending each other messages via the interconnect 308. There is no need for any shared memory; none is present in the processor of FIG. 3 so message-passing is the only mechanism by which the tasklets exchange data. In this embodiment, global synchronization across the multiple tiles 302 is achieved with dedicated synchronization hardware (see below). Nevertheless, the use of shared memory for global synchronization and/or other purposes in other embodiments is not excluded.

This disclosure provides a parallel computing model, details of which will now be described. A parallel program structured according to the present model can be represented as a graph comprising vertices, which represent tasklets (containing codelets and data), and edges, which represent paths along which messages can be sent. The edges are directed to express the order of computation, representing data dependencies and other precedence relationships.

Figure 4:
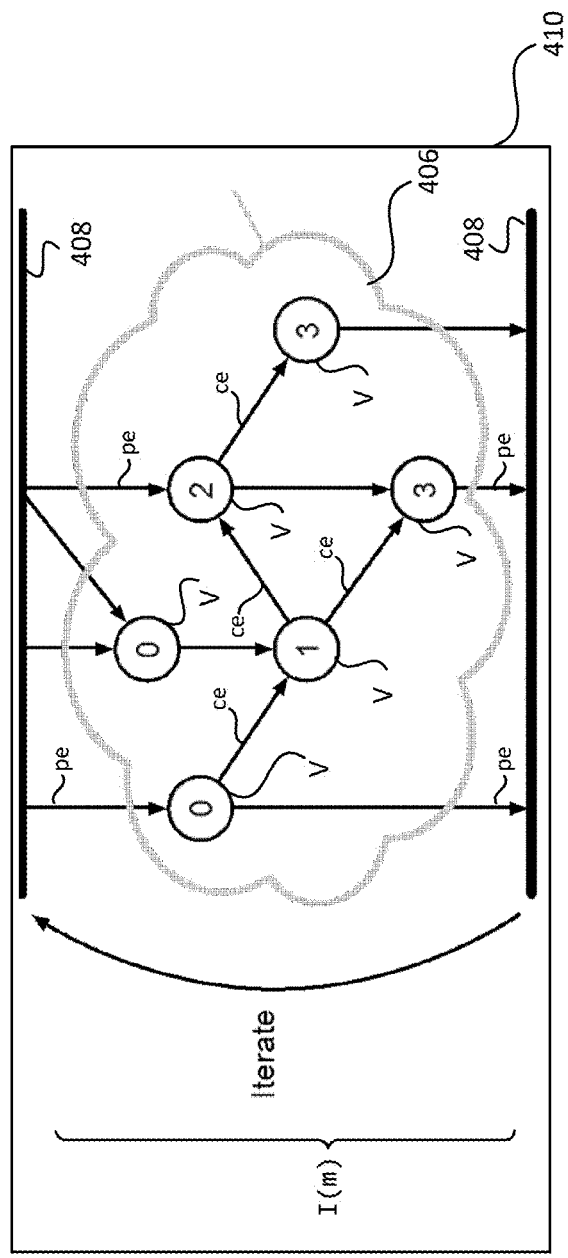
FIG. 4 gives a high-level, schematic overview of a parallel computing model which is presented herein.

By way of example, FIG. 4 shows an exemplary high-level graph representation of a parallel computer program 410 which can be run on the analytic compute module 202. The computer program 410 is represented as a graph 406 of vertices V (analytic graph). Each of the vertices V represents a tasklet which is implemented by executing the corresponding codelet on a processing unit 304.n; the codelet, when executed, operates on value(s) which have been generated by other tasklet(s) (second value(s)) and/or supplied from an external source—as represented by edges to vertices—to generate value(s) ("first value(s)" or equivalently "output value(s)") which are supplied to other tasklets and/or back to the external source—as represented by edges from vertices. The graph 406 is (that is, the parallel operations represented by the graph 406 are) iterated multiple times whereby, at each but the very first iteration, first values are generated based on second values that were generated in the preceding iteration. An iteration of an analytic graph is equivalently referred to herein as a "compute cycle". The notation "I(m)" is used herein to denote the mth iteration of an analytic graph, such as 406, or sequence of such graphs (see text accompanying FIG. 6A, below). The iterations are barrier synchronized, as represented by a barrier 408 in FIG. 4, in that the next iteration I(m+1) of the graph 406 does not commence until every tasklet of the current iteration I(m) has completed in its entirety. Edges directed to and from the barrier, labelled "pe" in FIG. 4, correspond to messages to be received in the next iteration I(m+1) and which have been from the preceding iteration I(m-1) respectively. To this extent, the program 410 is structured according a programming model that is similar to the BSP model outlined above.

However, note that—in contrast to BSP—edges, labelled "ce", are also permitted between vertices that are not via the barrier 408. These represent messages are received by and become visible to and can thus be used by a vertex in the same iteration I(m) as they are generated. In other words, to allow the expression of loops in this graph representation of the program, two types of edge are distinguished—those which carry messages to be received during the current iteration (non-pipelined messages), and those which are to be received in the next iteration (pipelined messages); the former are referred to as "non-pipelined edges" (labelled "ce") and the latter as "pipelined edges" (labelled "pe").

As will be appreciated, the program 410 is greatly simplified for the purposes of illustration and will generally contain a significantly greater number of vertices and edges.

Though not as restrictive as BSP, the present programming model does still place the following restrictions on the program structure:
- The analytic graph 406 must be acyclic i.e. starting at any vertex V, there cannot exist any sequence of non-pipelined edges ce by which it is possible to loop back to that vertex without crossing the barrier 408;
- The tasklets represented by the vertices V must be causally scheduled i.e. scheduled so that, for every tasklet which has a non-pipelined edge directed to another tasklet, the former is completed in its entirety before the latter begins;
- The program is consensus-driven i.e. the next iteration cannot begin until every tasklet of the current iteration has completed in its entirety;
- Messaging between vertices is postal i.e. vertex V can send a message to vertex V' at any point in the program without vertex V' having to be, for instance, informed of the message or in a state of message alertness.

With these restrictions in place, the present model can provide guaranteed deterministic program behaviours, free from deadlocks, whilst providing greater flexibility to the programmer than conventional BSP.

Figure 7:
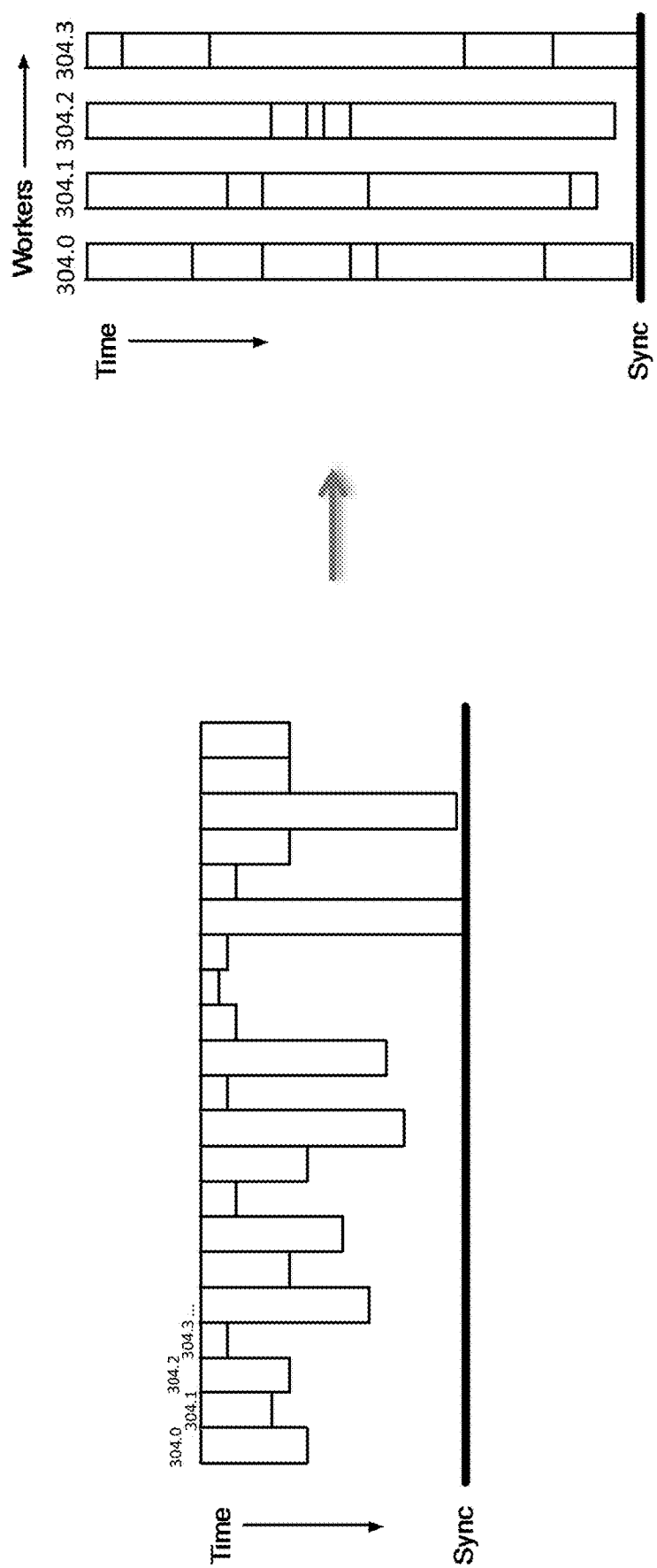
FIG. 7 illustrates principles of a load balancing mechanism.

In general there will not be a one-to-one mapping between the tasklets of the parallel program 410 and the N processing units 304 of the analytic compute module 202. For performance scalability and efficient machine utilization it is usually a priority of the parallel programmer to express more tasklet parallelism than there is machine parallelism. Some of the reasoning behind this for this will now be described with reference to FIG. 7. Generally, different tasklets will be of differing complexity, and will thus take different amounts of time to complete. In the extreme case of a one-to-one mapping between tasklets and the N processing units 304, assuming each tasklet takes a different amount of time to complete, all but one of the N processing units 302 would be unoccupied for at least part of each iteration I(m), and many would be unoccupied for the majority of the iteration I(m), which is inefficient. This is illustrated on the left-hand side of FIG. 7 (each vertical bar in FIG. 7 represent time intervals for which a processing unit 304.n is occupied with a single tasklet). However, by assigning multiple tasklets to each processing unit in an unbiased (e.g. round-robin) fashion, as illustrated on the right-hand side of FIG. 7, the differing completion times average out so that each processing unit 304.n remains occupied for all or most of each iteration, making efficient use of processing resources.

Therefore each processing unit 304.n will usually implement many tasklets during each iteration of the program execution. The graph 406 which expresses the program is partitioned into N sub-graphs, one per processing unit 304.n, and each sub-graph has many vertices, each representing a tasklet. Therefore some edges of the graph (message paths) are entirely local to a processing unit 304.n, and others require message transmission between different processing units via the interconnect 308, to implement both the non-pipelined and pipelined edge dependencies. Therefore some coordination is required between tasklets to implement a deterministic program, within both a single iteration (due to non-pipelined edge dependencies) and between different iterations (due to pipelined edge dependencies). For example, precedence relationships must be respected and deadlock must be avoided.

Figure 5:
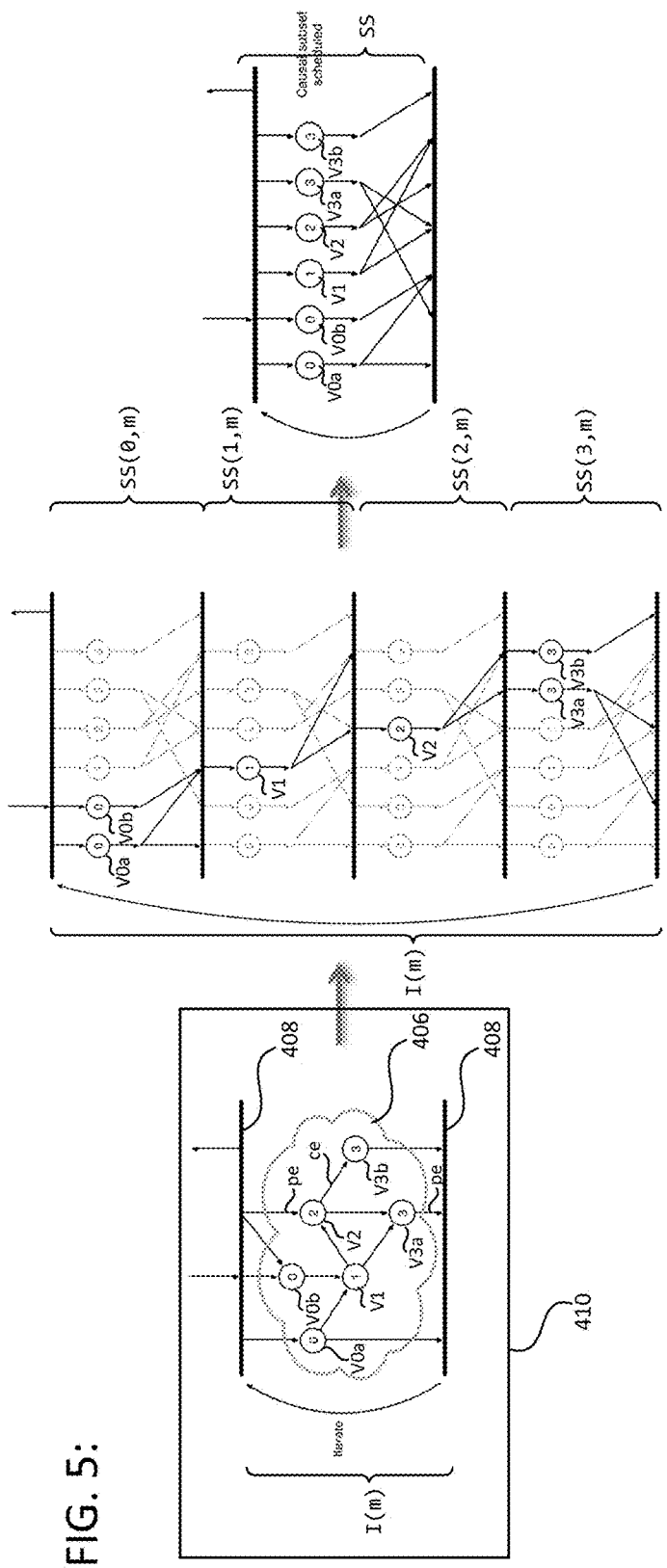
FIGS. 5 and 6 give a high-level, schematic overview of the manner in which a program written to the new model can be interpreted so as to run it on a computer.
Figure 6:
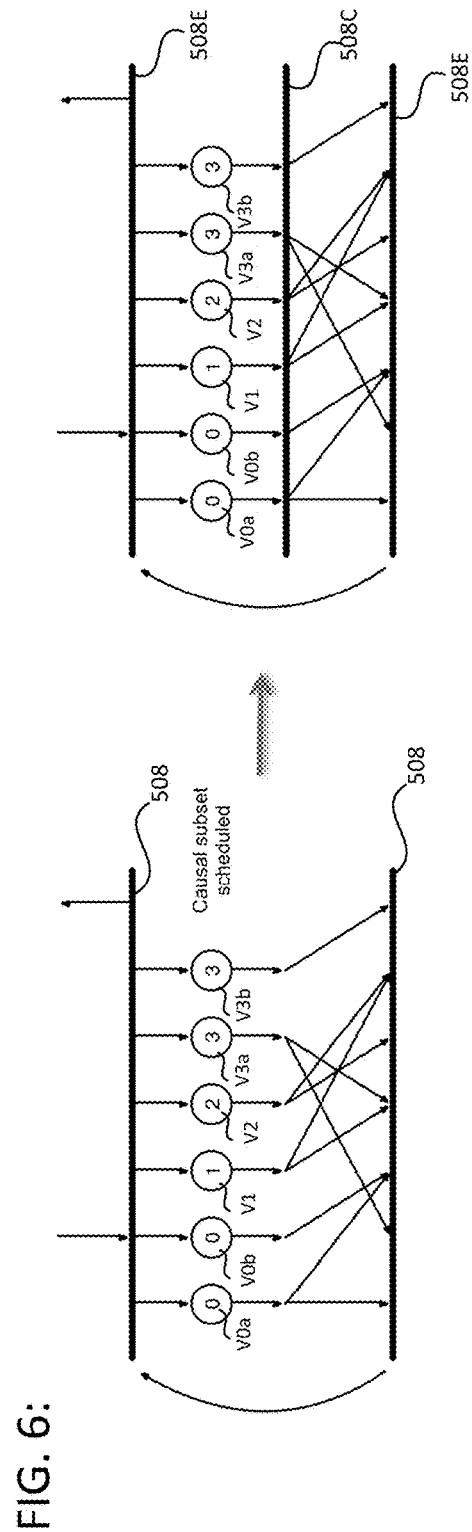

As will be described in detail below, in order to execute an iterative parallel program structured according to the present programming model, the program is divided into multiple BSP supersteps, whereby multiple supersteps are performed in each iteration of the graph 406. A "superstep" is sometimes referred to simply as a "step" herein. This is illustrated by way of example in FIGS. 5 and 6 for the parallel program 410 introduced in FIG. 4. Six vertices representing individual tasklets of the program 410 are shown, for which the labelling V0a, V0b, V1, V2, V3a, V3b is adopted in FIGS. 5 and 6 for reasons that will become apparent.

Each vertex is assigned to a level according to the following level assignment rules:
- Each vertex to which only pipelined edge(s) are directed is assigned to a lowest level (l=0);
- Each other vertex is assigned to a level (l'+1) where l' is the highest level vertex from which there is a non-pipelined edge directed to the other vertex.

So, for the exemplary program 410, the vertices V0a and V0b are assigned to level 0 as only pipelined edges are directed to them. As there are non-pipelined edges directed to all of the other vertices, they are assigned to levels greater than 0. There are two non-pipelined edges to V1; as both are from level 0 vertices, V1 is assigned to level 0+1=1. There is a pipelined edge to V2, however as there is also a non-pipelined edge from V1, which is level 1, this means that 2 is assigned to level 1+1=2. In turn, there are non-pipelined edges directed from V2 to vertices V3a, V3b thus each is assigned to level 2+1=3, notwithstanding the fact that there is also an edge from V1 to V3a as V2 is of higher level than V1.

Once labels have been assigned, each single iteration of the graph 406 is implemented by performing a sequence of L BSP-type supersteps at each of the processing units 304.n, where L is total number of different levels to which vertices have been assigned (L=4 in this example). This is described in detail below.

First, it is noted that a "superstep" in this context is defined according to a variant of Valiant's original BSP as referred to in the Background section. In this variant, BSP programs alternate between a compute phase and a message exchange phase. In the compute phase, each processing unit 304.n is permitted to perform computation on data in its local memory 306.n, including any data received in messages from other processing units 304.n' in the previous exchange phase. During the compute phase, processing units may prepare messages to be sent to other processing units, but these messages will not be sent until the next exchange phase. When every processor has completed its local computation, the exchange phase begins. During the exchange phase, all messages are transmitted and received via the interconnect 308 so that they become available for computation in the next compute phase. As the terminology is used herein, a single superstep can comprise a single compute phase and a single exchange phase. Importantly, there are twice as many synchronizations (i.e. twice as many barriers) in this variant, between compute and exchange, and between exchange and the next compute.

Although it doubles the number of processor synchronizations, this variant of BSP is advantageous because it completely separates compute and exchange activity. This confers a number of advantages, including that it allows the exchange of messages to be coordinated to make maximally efficient use of an interconnection fabric i.e. that of the interconnect 408. This behaviour will be described in due course.

First, returning to FIG. 5, the centre diagram shows how a single iteration I(m) of the graph 406 may be implemented as a sequence of supersteps, for which the notation SS(0,m), SS(1,m), . . . , SS(L-1,m) is used. Note, and SS(I,m) means the Ith superstep performed in the mth iteration I(m) of an analytic graph, such as 406, or sequence of such graphs. At each superstep SS(I,m), only the tasklets represented by vertices of level I are performed. As illustrated on the right hand side of FIG. 5, an iteration can thus be viewed as L repetitions of a conventional BSP superstep SS—though with an important difference that will be addressed shortly— which includes all tasklets represented by verities V0, . . . , V3b of every level, constrained so that, at each repetition I, only the subset of tasklets (i.e. those of level I) are performed. In accordance with the BSP variant described above, as illustrated on the right hand side of FIG. 6, each repetition of the superstep SS (that is, each superstep SS(I, m)) comprises temporally distinct compute and exchange phases as represented by the separate compute and exchange phase barriers 508C and 508E of FIG. 6.

Figure 6A:
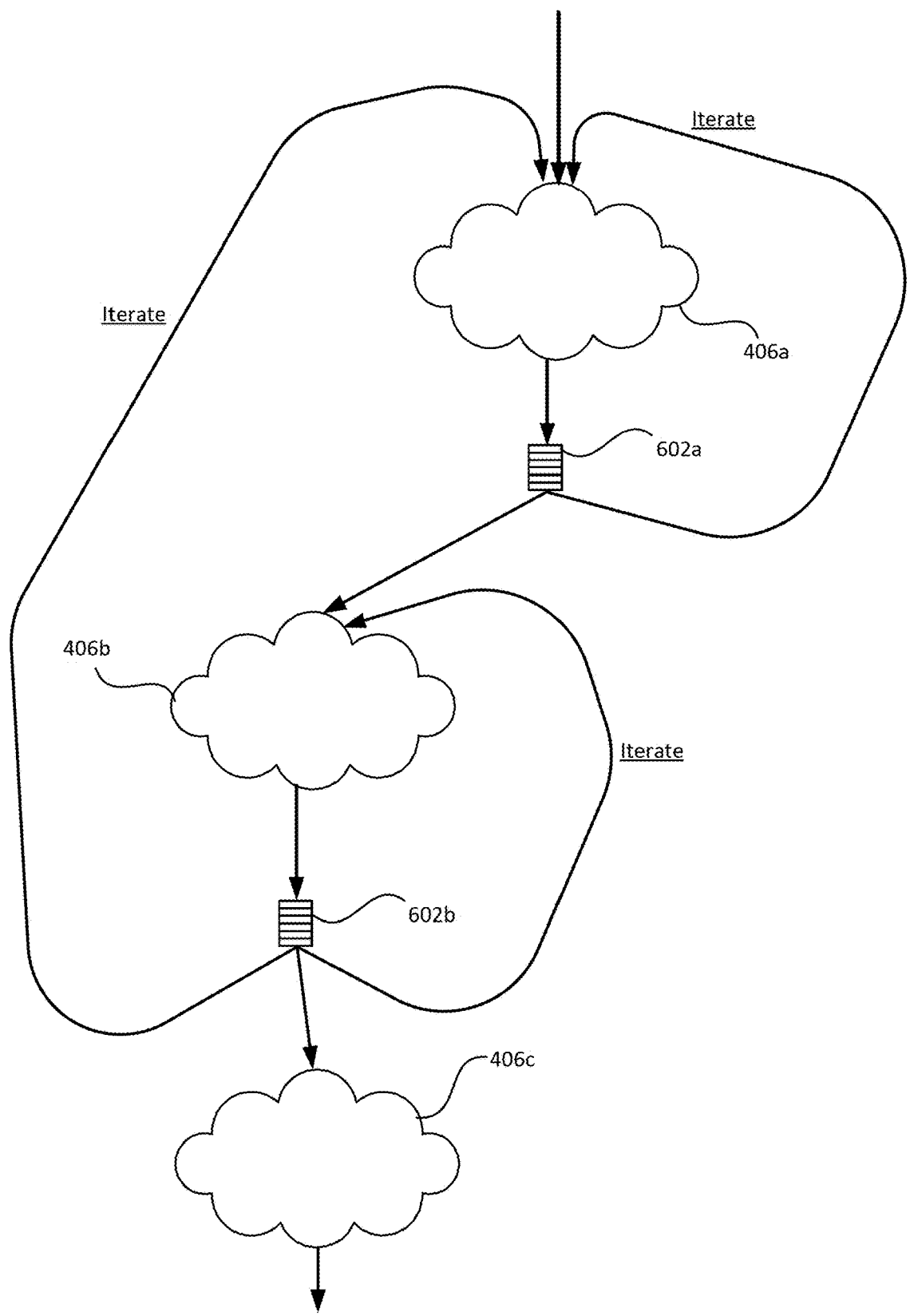
FIG. 6A shows a computer program comprising multiple analytic graphs.

FIG. 6A illustrates how a parallel program can comprise multiple analytic graphs 406a, 406b, 406c, each of which can be implemented in the manner described above. Individual analytic graphs (e.g. 406a and 406b) or sequences of analytic graphs (e.g. as formed by 406a and 406b) can be iterated one or more times. At the end of an analytic graph or sequence of graphs, a loop condition may be evaluated by executing a code sequence 602a, 602b to decide whether to perform another iteration of the analytic graph of sequence of graphs, or to branch to elsewhere in the program e.g. to a different analytic graph (to 406b from 406a, or to 406c from 406b).

Note that, for any given level I, the same codelets are run at every superstep SS(I,m) for every iteration m=0, 1, . . . , M but on different data. That is a respective set of code sequences is executed at every iteration of each superstep.

The important difference alluded to above is that, within any given superstep S(I,m) of any given iteration I(m), any given tasklet may not only be operating on:

1) for I>0, pipelined messages from SS(I−1,m). That is the preceding superstep of the same iteration I(m)); and/or
2) messages sent in any one or more of the supersteps SS(0,m−1), SS(1,m−1), . . . , SS(L,m−1) of the preceding iteration I(m−1).

1) arises due to non-pipelined edges ce in the program 410; 2) arises due to pipelined edges pe in the program 410. This is because non-pipelined messages are used in the same iteration I(m) as they are received, whereas pipelined messages come from the preceding iteration I(m−1). Thus, in a given superstep SS(I,m), the same or different tasklets may be simultaneously operating on messages sent in both the current iteration I(m) and the preceding iteration I(m−1). Below are presented mechanisms to ensure that both types of messages are available when needed.

Figure 8:
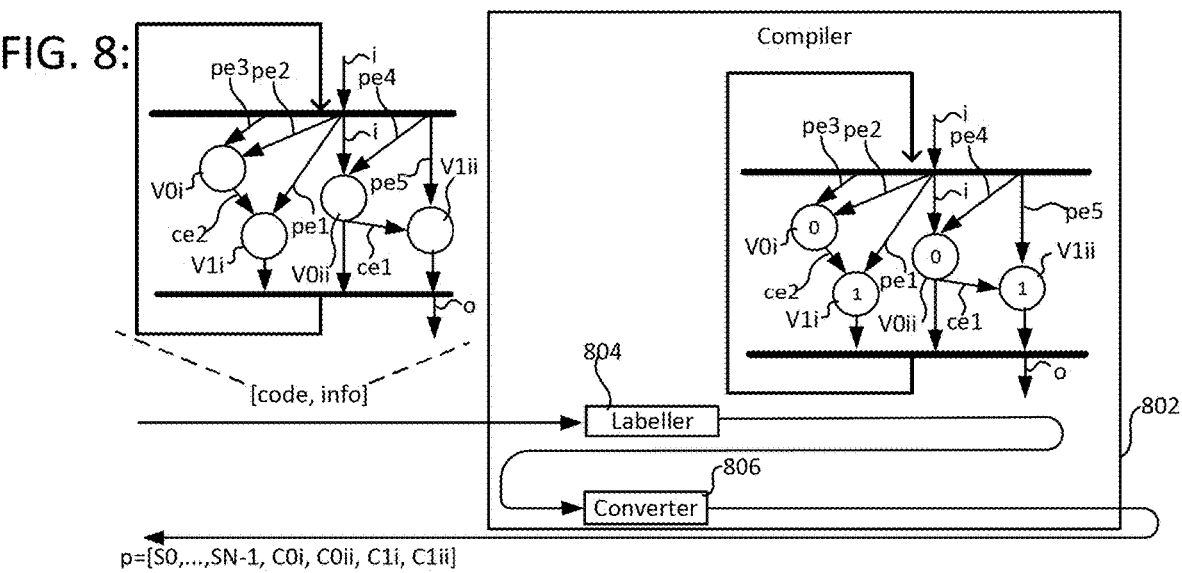
FIG. 8 shows functional components of a compiler.

FIG. 8 shows functional components a compiler 802, in the form of a labeller 804 and a converter 806. The labeller and converter 804, 806 are implemented as code executed on a computer. The labeller receives a high level parallel program "[code, info]" written in a high level parallel computing language, structured according to the present computing model. "code" represents the high level code that defines the various tasklets (i.e. vertices) as written by the programmer; "info" represents the additional information that is required for a parallel program, and defines communication between and synchronization of the tasklets i.e. edges between the vertices, and whether those edges are non-pipelined or pipelined. As illustrated, in the example of FIG. 8, the program "[code, info]" defines four vertices V0i, V0ii, V1i, V1ii and the following edges:

pipelined edges:
    pe1 from V0ii to V1i,
    pe2 from V0ii to V0i,
    pe3 from V1i to V0i,
    pe4 from V1ii to V0ii, and
    pe5 from V1ii to V1ii (i.e. to itself); and
non-pipelined edges:
    ce1 from V0ii to V1ii, and
    ce2 from V0i to V1i.

The vertices V0i, . . . , V1ii and edges pe1, . . . , ce2 constitute an analytic graph to be iterated M times. As will be apparent, according to the above presented labelling scheme, V0i, V0ii are level 0 vertices and V1i, V1ii are level 0 vertices, though their levels are not explicitly identified in the program [p, info] in this example. The choice of edges is purely exemplary; there is no particular significant to this choice of edges but for the fact that V0ii has both a non-pipelined edge to a level 1 vertex (ce1 to V1ii) and a pipelined edge to a level 1 vertex (pe1 to V1i)—see below. Thus, in accordance with the above described principles, the analytic graph will implemented as a sequence of two supersteps (as there are two levels in total), iterated M times.

The labeller 804 parses the program [code, info] to identify the levels of the various vertices in accordance with the labelling mechanism, and labels each vertex with a label data which conveys its identified level. The compiler 802 operates in accordance with the principles above to convert the graph into a sequence of BSP supersteps that is iterated multiple times. The labelled program is inputted to the converted 806, which converts the high level program into a low level program p suitable for execution on the processor 202, which is outputted by the compiler 802. The low level program p comprises a set of machine code sequences C0i, C0ii, C1i, C1ii, each suitable for execution on an individual processing unit 304.n. The code sequences C0i, C0ii, C1i, C1ii are the codelets, in low level machine code form, which correspond to the vertices V0i, V0ii, V1i, V1ii respectively. The program p further comprises a set of N supervisor threads S0, . . . , SN−1, are comprise sequences of machine code instructions. Each supervisor code sequence S.n is for execution on a respective tile 302.n, and coordinates the execution of a subset of codelets to be executed on that tile 302.n, and among other things defines the various edges between the codelets. That is the graph structure of the program is embodied by the supervisor code sequences.

The program p also comprises respective level data which, for each level, identifies each codelets of that level. The relevant supervisor code sequence, when executed, schedules the codelets based on the level data by, in each iteration, first selecting the codelets identified as level 0 for execution, then those identified as level 1 etc.

Each supervisor code sequence also implements the exchange phase of each superstep. Only the supervisor code sequences run in the exchange phase—the codelets C0$i$, . . . , C0$ii$ do not.

Figure 9:
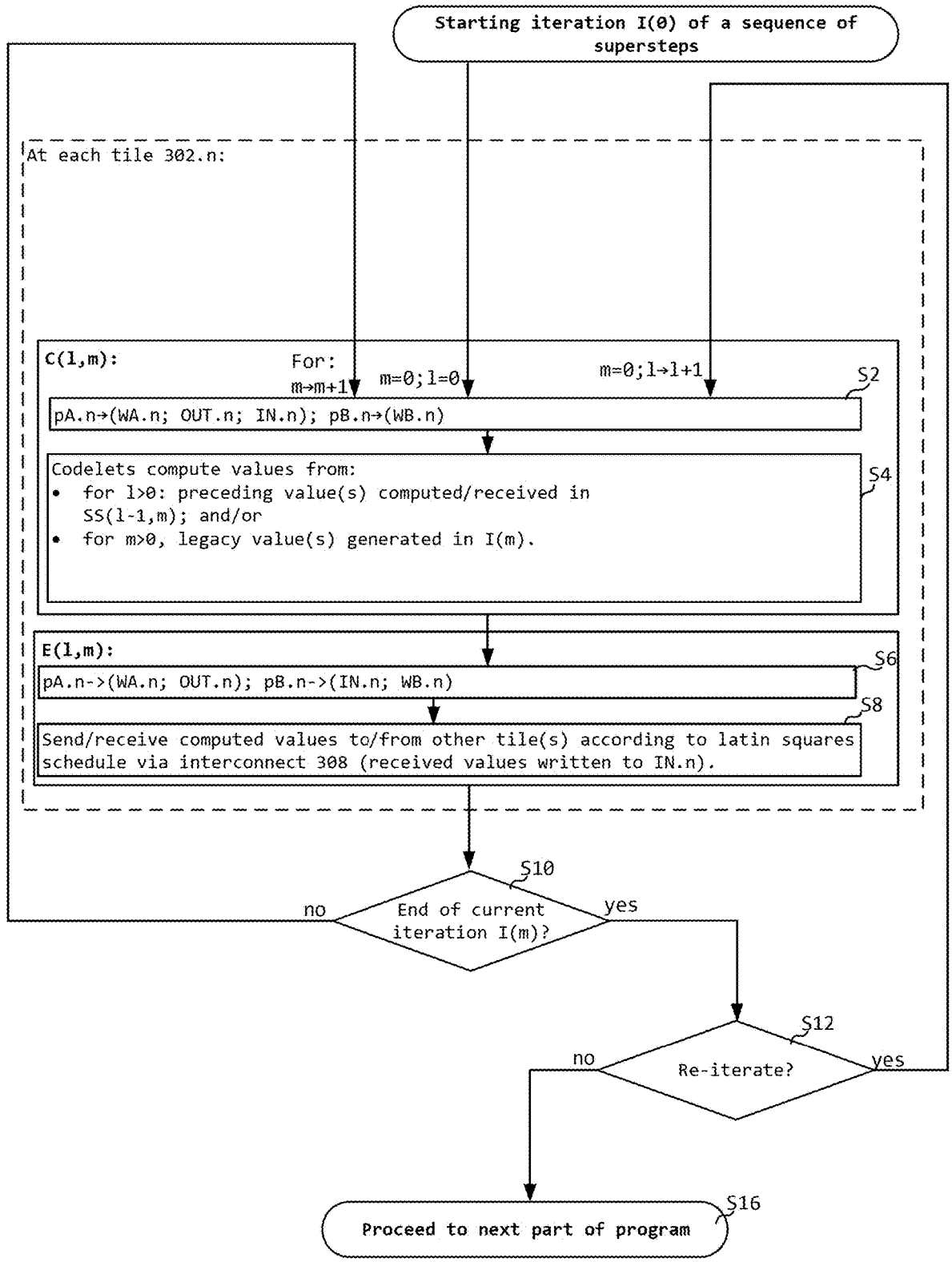
FIG. 9 shows a flow chart for a method for executing a compiled parallel program.

FIG. 9 shows a flow chart for a method for executing a compiled parallel program, such as the exemplary program p of FIG. 8. In the method of FIG. 9, multiple iteration I(m) (where m=0, 1, . . . ) of a sequence of supersteps SS(0,m), SS(1,m), . . . are performed, starting with the first superstep SS(0,0) of the first iteration I(0) as a current superstep.

Each superstep S(I,m) of each iteration commences with a respective compute phase C(I,m). In the respective compute phase C(I,m):

At step S2, the first port pA.n is assigned to the first workspace, input and output regions WA.n, IN.n and OUT.n, and the second port pB.n is assigned to the second workspace region WB.n for reasons discussed below. In this example, the allocations are effected by modifying the partitioning address at that tile 302.$n$ to move the partitioning boundary accordingly;

At step S4, a respective set of one or more output values is computed for the current compute phase C(I,m), which may be based on earlier values computed the preceding superstep SS(I−1,m) and/or the preceding iteration I(m−1). The output set is written to the output region OUT.n.

Once the compute phase C(I,m) has completed in its entirety, the method proceeds an exchange phase E(I,m) (S6-S8) of the current superstep SS(I,m). In the exchange phase E(I,m), at each tile 304.$n$:

At step S6, exchange phase partitioning data is written to that tile's control register R.0. The partitioning address specifies a memory address in the memory 306.$n$ below which the second port pB.n has access and above which the first port pA.n has access. In this manner, different regions defining addresses above and below the specified memory address are assigned to the first and second ports pA.n, pB.n of that tile 302.$n$ respectively (see below).

At step S8, a message exchange process is performed as follows. Values which were computed by that tile 302.$n$ in the compute phase C(I, m) of the current superstep SS(I,m) are accessed in the memory 306.$n$ via the first port pA.n, and sent to the other tiles via the interconnect 308; values which have been similarly computed by other tiles in the compute phase C(I, m) of the same superstep SS(I,m) ("second values" or equivalently "input value(s)"s) are also received in the exchange phase E(I,m) via the interconnect 308 and written to the memory 306.$n$ but via the second port pB.n.

The current superstep for the first run through the process of FIG. 9 is S(0,0), but the steps are repeated iteratively for later supersteps of the same and later iterations, hence the more general notation.

During the message exchange S8, fully efficient use of the interconnect 308 is achieved by every processing unit simultaneously sending and receive message traffic at full speed. This is referred to as "all-to-all personalised communication"; at every moment each processing unit is both sending message data to a second processor and receiving message data from a third processing unit.

Figure 11A:
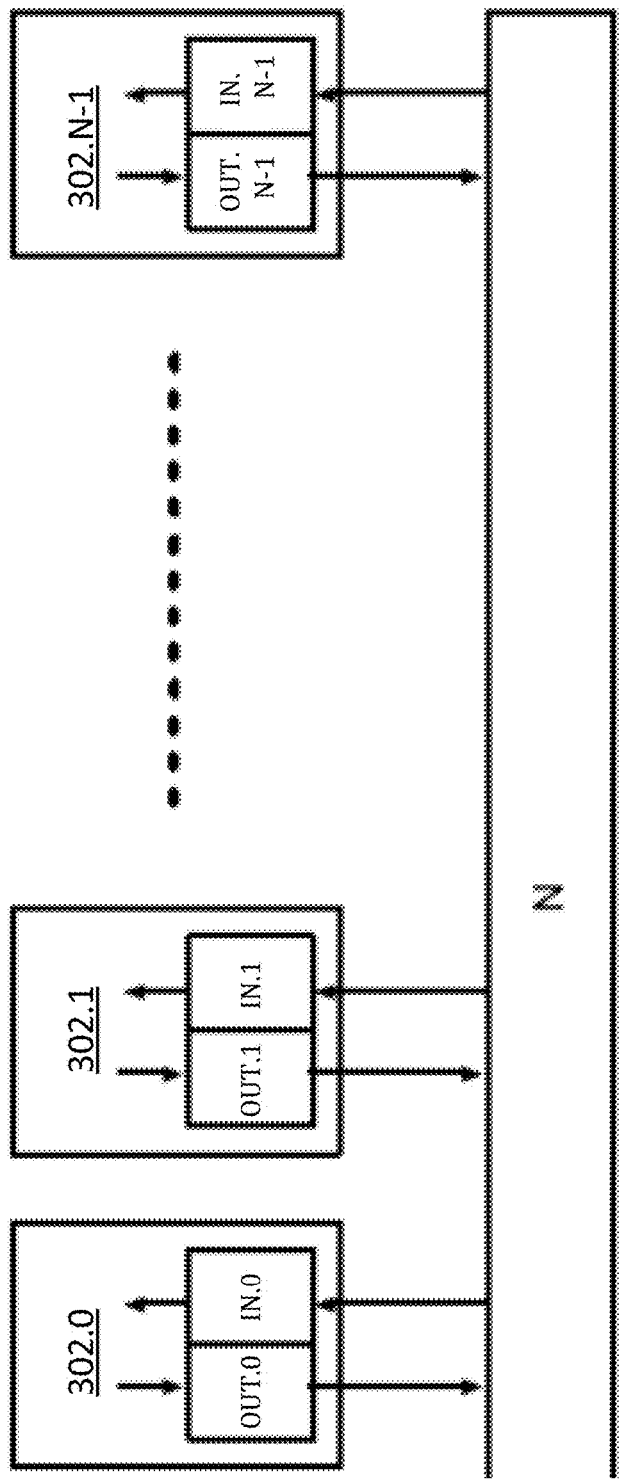
FIG. 11A schematically illustrates a message exchange process in an exchange phase of a parallel program.
Figure 11B:
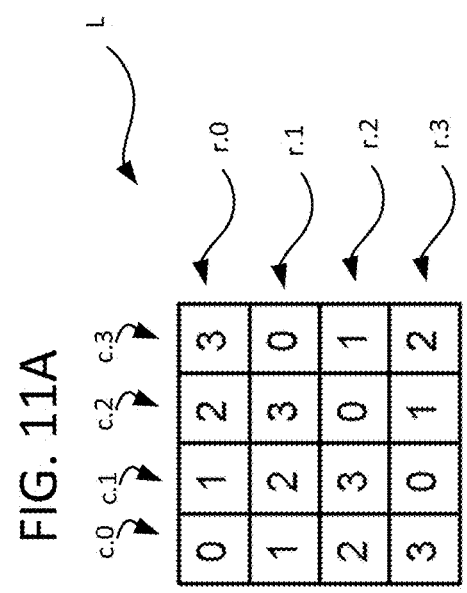
FIG. 11B shows a schematic representation of a Latin square.

Schedules whereby multiple processing unit coordinate to achieve this are known as Latin squares schedules. A d-dimensional Latin square is a d-by-d matrix of numbers, such that in every row and every column each number from 0 to d−1 appears (in this example counting begins from 0 but this is not significant and any number can be chosen), yet every row and every column has a different sequence of those numbers. A simple example of a Latin square L of dimension d=4 is shown in FIG. 11B. An exchange schedule constructed according to a Latin square operates as follows. A Latin square of dimension is d=N is generated, N being the number of processing units. The message exchange process of S6 takes place in N−1 sub-phases, referred to individually as "a sub-phase p" or similar. A convention is adopted herein whereby p $\in$ (1, . . . , N−1) for reasons of convenience that will become apparent shortly.

The generated Latin square has N rows r.n and N columns c.n where n=0, . . . , N−1 (4 rows are shown in FIG. 11B accordingly). In this example, processing units 304 are numbered from 0 to N−1. In each sub-phase p $\in$ {1, . . . , N−1}, a respective row r.p of the Latin square specifies the destination of messages sent from each processing unit 304.$n$, such that the destination for processing unit 304.$n$ is numbered in column c.n of the row r.p. One of the rows (in this example, r.0) of the Latin square contains the number sequence [0, 1, 2, . . . N−1] signifying the mapping of each processing unit to itself; this row is not used, which is the reason for having N−1 and not N sub-phases of the message exchange process of S8.

The exchange process of S8 is conducted such that each of these sub-phases defined by rows of the Latin square L do not overlap. In this case any interconnect 308 having a bisection bandwidth equal to the aggregate bandwidth between the processing units 304 and the interconnect 308 is guaranteed to be non-blocking, and exchange will thus proceed at the fastest possible speed. Note that there are many possible Latin squares for any significant dimension p. FIG. 11B illustrates a Latin square L constructed according to a modulus (shifting) scheme which is advantageous as it is particularly simple for the processing units 304 to calculate, but nevertheless any Latin square of dimension N can be used.

Each processor may compute the Latin square individual, or it may only compute those components which it uses. Each processing unit 304.$n$ may have a dedicated scheduling register(s) in which the Latin square, or relevant components thereof, are held for use at each exchange phase.

Figure 10A:
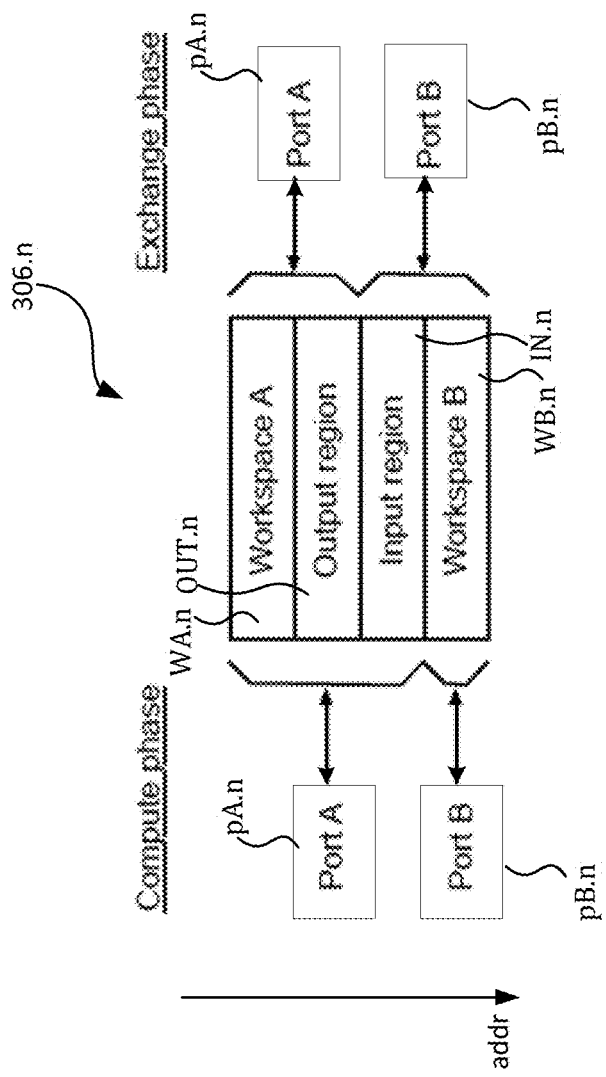
FIG. 10A illustrates a memory port allocation mechanism implemented during execution of a parallel program.

In order to support full-speed exchange of messages as described above, each processing unit 304.$n$ is configured to be able to both read and write simultaneously. In particular, the memory 306.$n$ has this simultaneous read-write property, since in general the memory 306.$n$ is the source and destination of message data. Memory density is of critical importance in computer design, especially where integrated in silicon with the processing unit 304.$n$. The density of a silicon memory is significantly reduced if it must provide more than one read/write port. Therefore, in the multiprocessor 202 of FIGS. 2 and 3 supporting the present compute model described above, it is most efficient to sub-divide the memory 306.$n$ into two parts (regions), such that during exchange one part can be read from whilst another part is written to. The two regions of memory which are separately accessible during exchange are referred to as the input region, into which message data from other processors is received, and the output region, from which message data is sent to other processors. The input and output regions are separate to one another i.e. non-overlapping. FIG. 10A illustrates the input region IN.n and output region OUT.n of memory 306.$n$. In addition a first workspace region WA.n and second workspace region WB.n are shown, the purpose of which is describe below.

This is, in part, the reason for the port assignment at step S6 of FIG. 9. Specifically, at this step S6 prior to instigating the exchange phase E(I,m) of the current superstep SS(I,m), the exchange phase partitioning data is written to the control register R.n at each tile 302.n to assign:

the first port pA.n to both the output region and the first workspace OUT.n, WA.n; and the second port pB.n to the input region IN.n and the second workspace region WB.n.

This is illustrated on the right-hand side of FIG. 10A. In FIG. 10A, memory addresses increment in the downward direction as shown, but this is just exemplary.

With the ports thus allocated, each processing unit 304.n is able to issue a load/store instruction in the current exchange phase E(I,m) to a part of memory which includes the input region IN.n, simultaneously with another load/store operation to a part of the memory which includes the output region OUT.n. In this manner, first values are retrieved and accessed from the output region OUT.n (via the first port pA.n) at the same time as second values, which have been received from other tiles, are stored to the input region IN.n (via the second port pB.n) as illustrated in FIG. 11B.

Different programs may require different amounts of memory in the two regions, depending on the internal state of tasklets, the amount of message traffic between them, and the partitioning of the tasklet graph between processors. Therefore rather than equipping each processor with two dedicated memories, one for each memory port used during compute or exchange, it is preferable to provide a single partitionable memory 306.n at each tile 302.n. As mentioned, a processing unit control register R.n identifies an address (partition) which partitions the first workspace region WA.n and the output region OUT.n from the input region IN.n and the second workspace region WB.n. A single control register can be used for this purpose. That is, below (or below or at) the address identified in R.n, one port has access (e.g. pB.n) and at or above (or above) that address the other (e.g. pA.n) has access. Provided the memory is constructed of a number of independent banks, and the partition is constrained to be at a bank boundary, then each bank need only support a single port and maximal density of the memory 306.n can be achieved.

A communicate instruction having two operands, called "COMM" by way of example herein. COMM takes two operands: an address of an output value in the output region OUT.n (addr_out) and an address of an input value in the input region IN.n:

COMM addr_out addr_in

COMM may be executed on the processing unit 304.n in the exchange phase E(I,m) to retrieve the output value from addr_out and supply it to the interconnect 308 simultaneously with writing an input value which has been received via the interconnect 308 to addr_in. The operand may specify the location, or they may identify registers at which the locations are identified. The operand are not essential e.g. if addr_out and addr_in are always written to dedicated registers. Note that COMM need not have any operand identifying the tile for which the output value at addr_out is destined as this can be determined instead by the Latin squares schedule. That is, the destination is determined by the current sub-phase of the exchange phase.

Thus, the exchange phase may be implemented by executing one or more COMM instructions with different operands. In the compile program p, COMM instructions will be included in the supervisor code sequences S0, . . . , SN−1.

Providing a single communicate instruction able to handle both inputs and output simultaneously reduces the number of instructions that need to be executed in the exchange phase.

Once all N−1 sub-phases of the exchange phase S8 have completed, the method proceeds to the next superstep in the following manner. At step S10, it is determined whether the end of the current iteration I(m) has been reached i.e. whether the last superstep of the current iteration I(m) has been performed. If so, the method proceeds to step S12 at which it is determined whether to perform another iteration of the sequence of supersteps, for example by evaluating a loop termination condition in the program. The loop termination condition may for instance be an iteration counter reaching a threshold, a particular output value(s) converging to a stable value etc. If the condition is met, execution branches to some other part of the program (S16), for example to perform some different sequence of supersteps or to terminate the program.

If at step S10 the end of the current iteration I(m) has not been reached, the method proceeds to the compute phase C(I+1,m) of the next superstep S(I+1,m) of the current iteration I(m). That is S2-S4 are repeated for S(I+1,m). The current iteration is completed when all codelets from the lowest to the highest level have been executed in the relevant compute phases. A level counter may be used to track which level of codelets have been executed, and thereby ascertain when the end of the current iteration I(m) has been reached.

Returning to step S12, if the final superstep of the current iteration I(m) has been reached, the method proceeds to the next iteration I(m+1), and proceeds as above for the next iteration I(1+m).

The reasons for varying the port allocations will now be explained.

Note that a message need only be sent across the interconnect 308 once during an exchange phase E(I,m), however many tasklets at the receiving processor may consume the message during the next compute phase C(I+1,m). Recall that some edges of the tasklet graph which forms the program will be internal to a processing unit 304.n, so will not require any corresponding message to be sent over the interconnect 308 during the exchange phase. Such messages may still be prepared in the output region OUT.n. However, copying the message to the input region IN.n during the exchange phase E(I,m) would waste memory, since two identical copies would exist in the memory 306.n of the same processing unit 304.n.

Now consider the usage of memory 306.n during the compute phase C(I,m). The processing unit 304.n will require read access to messages which are inputs to its tasklets—these messages will be in the input region IN.n for tasklets which are executed on other processing unit, or in the output region OUT.n for tasklets which are executed on the same processing unit 304.n. The processing unit 304.n will also require write access to the output region OUT.n to form new outgoing messages, and read/write access to some working memory, i.e. at least one of the workspace regions WA.n, WB.n to store the persistent state of tasklets and intermediate values during tasklet computation.

During the compute phase C(I,m), performance can be enhanced if the two memory ports pA.n, pB.n are also available to two simultaneously-issued load/store instructions. That is, since the exchange phase requires two memory ports for full efficiency, it is desirable to allow both ports to be used also during the compute phase.

Now consider that a compiler or assembly programmer wishes to schedule a load-store instruction to workspace alongside a load instruction of an input datum for a tasklet. The tasklet input may come from either the input region IN.n (for local messages) or the output region OUT.n (for messages from other processing units). If these regions are accessed via different memory ports, one case or the other will collide with the access to workspace. Therefore in the compute phase it is useful to re-map (i.e.-repartition) the memory so that both the input region IN.n and the output region OUT.n are accessed via the same port (pA.n or pB.n), and a workspace (e.g. WB.N) region via the other port (pB.n or pA.n). That is, so that a workspace region (e.g. WB.n) has a dedicated port in each compute phase.

Therefore the mapping of memory ports to memory addresses in the compute phase differs from that in the exchange phase—in this example, the input region IN.n moves from the address space of one memory port to the other. Note this is just an example, and alternatively the output region OUT.n could be the one that moves.

FIG. 10A shows an example compute phase scheme on the left-hand side, in which the second port pB.n is dedicated to the second workspace region pB.n, and the input, output and first workspace regions IN.n, OUT.n, WA.n all share the first port pA.n.

In each exchange phase E(I,m), each tile may send pipelined data, non-pipelined data, or a combination of both depending on what is needed by off tile tasklets in the next superstep SS(I+1,m) or SS(0,m+1). That is both current and legacy output values may be send in the exchange phase to other tile(s).

In any given compute phase C(I,m), the new first values may be computed at each tile 302.n from:

1) for each superstep SS(I>0,m) i.e. for each but the very first superstep of the current iteration I(m):
   i. one or more of the first values that were computed in the compute phase C(I−1,m) of the preceding superstep SS(I−1,m) of the current iteration I(m) at the same tile 302.n. These are held in the output region OUT.n and accessed via the first port pA.n in the compute phase; and/or
   ii. one or more of the second values that were computed in the compute phase C(I−1,m) of the preceding superstep SS(I−1,m) of the current iteration I(m) at a different tile(s). These will have been received via the interconnect 308 and are held in the input region IN.n and are also accessed via the first port pA.n in the compute phase; and/or
2) for each iteration I(m>0) i.e. for each but the very first iteration I(0): one or more values of the legacy set as generated in the preceding iteration I(m−1) at the same tile 302.n. These are accessed via the second port pB.n; and/or
3) local working data held in the first or second workspace region WA.n, WB.n, which may have been generated at any point during the execution of the program.

1) is due needed to accommodate non-pipelined edges in the program, whereas 2) is needed to accommodate pipelined edges.

In the above example, the input region IN.n is reassigned between the second port pB.n (in the exchange phase) and the first port pA.n (in the compute phase), whereas the output region OUT.n remains assigned to the first port pA.n throughout. An equally valid alternative would be to reassign the output region OUT.n in this manner, and to leave the input region assigned to the first port pA.n throughout instead.

The first and second workspaces WA.n, WB.n may be addressable during the exchange phase as well as during the compute phase (via the first port pA.n and second port pB.n respectively in this example). This is not essential, however the workspaces might coincidentally be useful to the processor during its coordination of the exchange phase.

Global synchronization of compute and exchange phases across all N tiles 302 is coordinated by the synchronization logic 310. Each tile 302.n, once it has executed the last of its codelets in the exchange phase of a current superstep, instigates an exchange request signal to the synchronizer 310. Only when all tiles 302 have done this, the synchronizer 310 instigates a respective exchange proceed signal to each tile 302.n. In response to the respective exchange proceed signal the exchange phase E(I,m) of the current superstep is commenced at each tile 302.n. Similarly, each tile 302.n, once it has sent all the output values it wished to send in the exchange phase, instigates a compute request signal to the synchronizer 310. Only when compute request signals have been received from all tiles 302 does the synchronise 310 instigate a respective compute proceed signal to each tile 302.n, in response to which that tile 302.n instigates the compute phase of the next superstep.

Figure 8A:
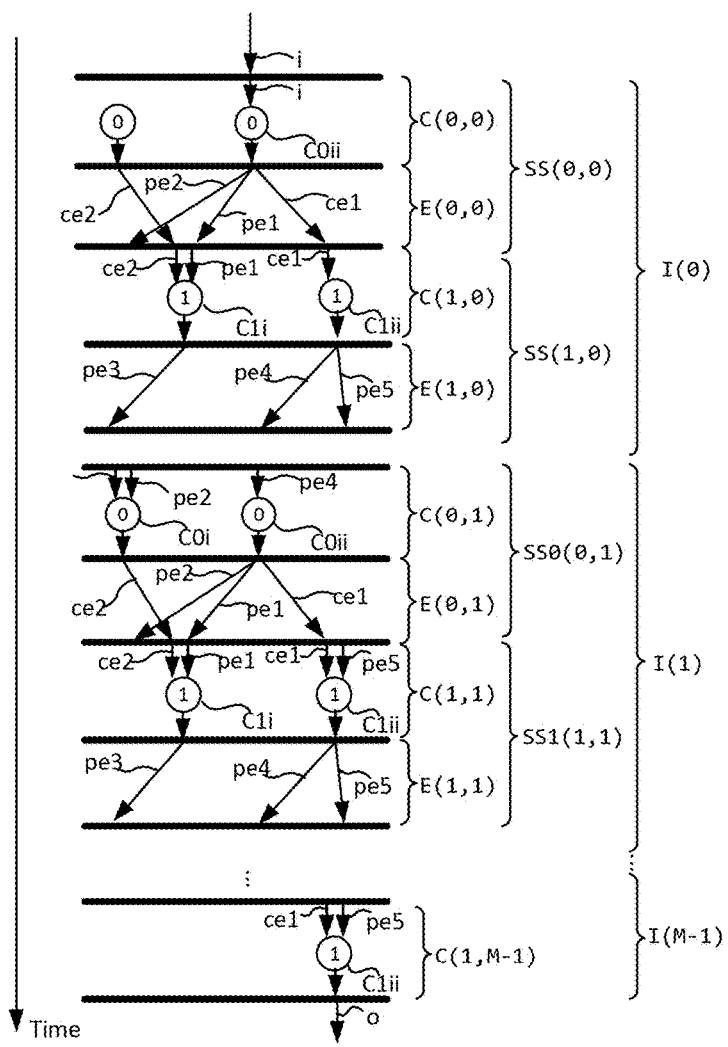
FIG. 8A provides a schematic graphical illustration of operations that are caused by executing a compiled parallel program.

To aid illustration, some of the steps of the flow chart of FIG. 9 are illustrated graphically in FIG. 8A for the compiled program p of FIG. 8 when executed on the multi-processor 202. In FIGS. 8 and 8A, "i" and "o" represent input value(s) and output values(s) at the start and end of the program p. Note, for example, that both a pipelined version and non-pipelined version of the level 0 codelet C0ii are used by the level 1 codelets C1i and C1ii simultaneously in the compute phase of the second superstep of each iteration, hence the need for two versions being held in memory.

To aid illustration, an exemplary implementation of the subject matter in the context of machine learning will be described. It will be appreciated that this is exemplary, and different implementations are within the scope of the subject matter.

Working data defining edges between different code sequences can be accessed most efficiently via the same port AA.n as the communicated data itself, whereas data that is used to manipulate the communicated data to generate the new set of output values can be most efficiently accessed via the "spare" port WB.n (that port being spare in each compute phase in the sense that it is not needed to retrieve values computed in an earlier superstep and/or iteration). The working data defining the edges identifies where the outputs generated by earlier tasklets, and needed by a current tasklet, are held in the input or output region IN.n, OUT.n. These may for instance be identified by suitable memory pointers.

As is well known, a neural network is implemented by layers of communicating "neurons". Each neuron in each but the first layer computes an output which is typically a nonlinear function of w. $x = \Sigma_i w_i x_i$, x being a vector in which each component is an output generated by a neuron in the preceding layer, and w being a vector of weightings $w_i$ which is local to that neuron and which is updated iteratively in order to train the neural network.

In the present context, each layer can be implemented as an individual step and each neuron in that layer as a codelet which is execute in that step to compute w.x for a respective x and w. Typically, the individual components $x_i$ of x, which in this context are output values computed on tile (in OUT.n) and/or received input values computed off tile (in IN.n), will be sparsely distributed in memory; to enable these to be retrieved by the codelet as needed, their locations in the tile's memory can be mapped in the memory e.g. using memory pointers—the mappings are most efficiently accessed via the same port as the components of x themselves, so the component are most efficiently stored in the first workspace region WA.n. By contrast, it is more efficient if the weightings w are accessed and updated via the spare port, thus these can be stored in the second workspace region WB.n to maximize efficiency.

The supervisor on each tile:
schedules tasklets by delegating tasklets to the workers WT.n at appropriate times;
implements barrier synchronization of the workers, to separate out compute and exchange phases;
evaluates loop conditions at the end of an integration of a sequence (e.g. an analytic graph or sequence of analytic graphs) to determine whether to perform another iteration of the that sequence (if the condition is satisfied) or to branch to elsewhere in the program (e.g. to a different analytic graph);
synchronization of compute/exchange phases by instigating compute and exchange request signals, and responding to compute/exchange proceed signals.

Each of the workers WT.n performs any tasklet delegated to it.

Regions don't have to be contiguous, though they are in the above.

In the context of "earlier and later steps of a sequence", "earlier" and "later" are relative to one another and only in the context of a given iteration of that sequence—a later step of an initial iteration of that sequence is performed before an earlier step of a subsequent iteration of that sequence.

Note that the term initial does not necessarily refer to the very first superstep in an iteration, or to the very first iteration in a program (though that is not excluded). That is, an "initial" superstep or iteration may only be initial in the context of a (sub)set of supersteps or iterations being described.

When a computing unit is said to send data to/receive data from a "different" computing unit, that means any computing unit different from the sender/receiver. Where it recites "sending/receiving a first value to/from a different computing unit and sending/receiving a second value to/from a different computing unit" (or similar) the former may or may not be the same as the later. That is, the terminology covers a single computing unit different from the sender/receiver and multiple computing units both different from the sender/receiver and from each other.

Other variants or applications of the disclosed techniques may become apparent to a person skilled in the art given the disclosure herein. The scope of the disclosure is not limited by the example embodiments discussed above, but only by the accompanying claims.

What is claimed is:

1. A method for executing a computer program, the method implemented by a processor comprising a plural number of computing units and an interconnect connected to the computing units, wherein each computing unit comprises a processing unit and a memory having at least two memory ports, each port assignable to one or more respective regions of the memory, wherein the method comprises at each computing unit:
performing an initial step of the program to write: an initial output value to an output region of the memory, and an initial input value to an input region of the memory; and
performing a subsequent step of the program by:
in a compute phase:
assigning one of the two ports to both the input region and the output region;
executing code sequences on the processing unit to compute an output set of one or more new output values, and writing the output set to the output region, the output set computed from the initial output and initial input values, each of which is retrieved via said one port in the compute phase;
when the compute phase has completed, in an exchange phase:
assigning a first of the two ports to the output region and a second of the two ports to the input region; and
retrieving a new output value of the output set from the output region via said first port and sending the retrieved value to a different computing unit via the interconnect, and receiving via the interconnect a new input value which has been computed by a different computing unit in the subsequent step and writing the received value to the input region via said second port.

2. A method according to claim 1 wherein said one port is also assigned to a first workspace region in the compute phase, the output set computed using first working data which is local to the computing unit, held in the first workspace region and retrieved via said one port in the compute phase.

3. A method according to claim 2 wherein the first working data identifies a first location in the output region at which the initial output value is held and/or a second location in the input region at which the initial input value is held.

4. A method according to claim 3 wherein the first working data comprises a first memory pointer to the first location and/or a second memory pointer to the second location.

5. A method according to claim 1, wherein the other of the two ports is assigned to a second workspace region of the memory in the compute phase, the output set computed using second working data which is local to the computing unit, held in the second workspace region and retrieved via said other port in the compute phase.

6. A method according to claim 5 wherein the second working data comprises a local value, and at least one new output value of the output set is computed in the compute phase by evaluating a function with the local value and the initial output and/or the initial input value as inputs to said function, the initial output and/or initial input retrieved via said one port and the local value retrieved via said other port.

7. A method according to claim 6 wherein the second working data comprises a first and a second local value, and the at least one new first value is computed as nonlinear function of a summation, the summation being of at least: a product of the first local value and the initial output value, and a product of the second local value and the initial input value, the initial values retrieved via said one port and the local values retrieved via said other port.

8. A method according to claim 1 wherein the new output value is retrieved from the output region and sent and the new input value is written to the input region by executing a single communicate instruction on the processing unit.

9. A method according to claim 8 wherein the single communicate instruction has an output operand identifying a location in the output region at which the new output value is held and an input operand identifying a location in the input region to which the received new input value is written.

10. A method according to claim 1 wherein the exchange phase is performed by performing a number of sub-phases in turn and, in each sub-phase, each computing unit sends data to at most one respective other computing unit, wherein the respective other computing unit does not receive data from any other computing unit in that sub-phase, and wherein that computing unit does not send data to the respective other computing unit in any other sub-phase of the exchange phase.

11. A method according to claim 10 wherein the number of sub-phases is one fewer than the plural number of processing units.

12. A method according to claim 10 wherein a schedule is held at each processing unit, which identifies, for each sub-phase, the respective other computing unit.

13. A method according to claim 12 wherein the schedule comprises at least part of a Latin square.

14. A method according to claim 12 when dependent on claim 7, wherein the single communicate instruction is executed in one of the sub-phases and does not include any operand identifying the other processing unit.

15. A method according to claim 1 wherein each computing unit is connected to the interconnect by a respective connection having an individual bandwidth, and the interconnect has a bandwidth at least as great as an aggregate of the individual bandwidths.

16. A method according to claim 1 wherein each processing unit has one or more control registers, wherein said one port is assigned to both the input and output regions in the compute phase by writing compute phase partitioning data to at least one of the control register(s), and wherein said first and said second ports are assigned to the output and input regions respectively in the exchange phase by writing exchange phase partitioning data to at least one of the control register(s).

17. A method according to claim 16 wherein the other of the two ports is assigned to a second workspace region of the memory in the compute phase, the output set computed using second working data which is local to the computing unit, held in the second workspace region and retrieved via said other port in the compute phase;
   wherein the second working data comprises a local value, and at least one new output value of the output set is computed in the compute phase by evaluating a function with the local value and the initial output and/or the initial input value as inputs to said function, the initial output and/or initial input retrieved via said one port and the local value retrieved via said other port; and
   wherein the compute phase partitioning data is in the form of a single address in the memory, and the exchange phase partitioning data is in the form of a different single address in the memory.

18. A method according to claim 1 wherein the processor comprises synchronization logic connected to each of the computing units, wherein at each computing unit:
   at the end of the compute phase, that computing unit instigates an exchange request signal to the synchronization logic, wherein the synchronization logic instigates an exchange proceed signal to each computing unit only when exchange request signals have been received from all of the computing units, and
   that computing unit instigates the exchange phase in response to receiving the exchange proceed signal.

19. A method according to claim 18, wherein at each computing unit wherein:
   the initial input value is received in an exchange phase of the initial step,
   at the end of the exchange phase, that computing unit instigates a compute request signal to the synchronization logic, wherein the synchronization logic instigates a compute proceed signal to each computing unit only when compute request signals have been received from all of the computing units, and
   that computing unit instigates the compute phase of the subsequent step in response to receiving the compute proceed signal.

20. A method according to claim 18 wherein the synchronization logic is dedicated synchronization hardware.

21. A method according to claim 1 wherein the subsequent step is the first of multiple subsequent steps which are performed in turn, each by computing an respective output set of one or more respective new output values in a compute phase of that step which are written to the output region, and receiving a respective new input value in an exchange phase of that step which is written to the input region, the respective output set computed from an output value that was written to the output region in the compute phase of the preceding step and/or an input value that was written to the input region in the exchange phase of the preceding step.

22. A method according to claim 17 wherein the other of the two ports is assigned to a second workspace region of the memory in the compute phase, the output set computed using second working data which is local to the computing unit, held in the second workspace region and retrieved via said other port in the compute phase;
   wherein the second working data comprises a local value, and at least one new output value of the output set is computed in the compute phase by evaluating a function with the local value and the initial output and/or the initial input value as inputs to said function, the initial output and/or initial input retrieved via said one port and the local value retrieved via said other port; and
   wherein, for each subsequent step, the local value is updated based on the output value that was written to the output region in the compute phase of the preceding step and/or the input value that was written to the input region in the exchange phase of the preceding step; and
   wherein at least one respective new output value is computed in the compute phase of each subsequent step by evaluating said function with the local variable as updated for that step and the output value that was written to the output region in the compute phase of the preceding step and/or the input value that was written to the input region in the exchange of the preceding step as inputs to said function.

23. A processor for executing a computer program, the processor comprising a plural number of computing units and an interconnect connected to the computing units, wherein each computing unit comprises a processing unit and a memory having at least two memory ports, each port assignable to one or more respective regions of the memory, wherein each computing unit is configured to:
   perform an initial step of the program to write: an initial output value to an output region of the memory, and an initial input value to an input region of the memory; and
   perform a subsequent step of the program by:
   in a compute phase:
   assign one of the two ports to both the input region and the output region;
   execute code sequences on the processing unit to compute an output set of one or more new output values, and write the output set to the output region, the output set computed from the initial output and initial input values, each of which is retrieved via said one port in the compute phase;
   when the compute phase has completed, in an exchange phase:

assign a first of the two ports to the output region and a second of the two ports to the input region; and retrieve a new output value of the output set from the output region via said first port and send the retrieved value to a different computing unit via the interconnect, and receive via the interconnect a new input value which has been computed by different computing unit in the subsequent step and write the received value to the input region via said second port.

24. A computer program product comprising executable instructions of a computer program configured, when execute on a processor comprising a plural number of computing units and an interconnect connected to the computing units, wherein each computing unit comprises a processing unit and a memory having at least two memory ports, each port assignable to one or more respective regions of the memory, to cause the processor to perform the following operations at each computing unit:

performing an initial step of the program to write: an initial output value to an output region of the memory, and an initial input value to an input region of the memory; and performing a subsequent step of the program by:

in a compute phase:

assigning one of the two ports to both the input region and the output region;

executing code sequences on the processing unit to compute an output set of one or more new output values, and writing the output set to the output region, the output set computed from the initial output and initial input values, each of which is retrieved via said one port in the compute phase;

when the compute phase has completed, in an exchange phase:

assigning a first of the two ports to the output region and a second of the two ports to the input region; and retrieving a new output value of the output set from the output region via said first port and sending the retrieved value to a different computing unit via the interconnect, and receiving via the interconnect a new input value which has been computed by a different computing unit in the subsequent step and writing the received value to the input region via said second port.

25. A computing unit for use in a processor for executing a computer program, the computing unit comprising a processing unit and a memory having at least two memory ports, each port assignable to one or more respective regions of the memory, the computing unit being configured to:

perform an initial step of the program to write: an initial output value to an output region of the memory, and an initial input value to an input region of the memory; and perform a subsequent step of the program by:

in a compute phase:

assign one of the two ports to both the input region and the output region;

execute code sequences on the processing unit to compute an output set of one or more new output values, and write the output set to the output region, the output set computed from the initial output and initial input values, each of which is retrieved via said one port in the compute phase;

when the compute phase has completed, in an exchange phase:

assign a first of the two ports to the output region and a second of the two ports to the input region; and retrieve a new output value of the output set from the output region via said first port and send the retrieved value to a different computing unit via an interconnect of the processor, and receive via the interconnect a new input value which has been computed by a different computing unit in the subsequent step and write the received value to the input region via said second port.

* * * * *